US 6,461,269 B1

United States Patent
Tonohata et al.

(10) Patent No.: US 6,461,269 B1
(45) Date of Patent: Oct. 8, 2002

(54) CONTINUOUSLY VARIABLE TRANSMISSION

(75) Inventors: Atsushi Tonohata; Minoru Sawayama; Yoshihiro Ikushima, all of Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/658,037

(22) Filed: Sep. 8, 2000

(30) Foreign Application Priority Data

Sep. 10, 1999 (JP) .......................................... 11-257676
Oct. 5, 1999 (JP) .......................................... 11-283935

(51) Int. Cl.[7] .................... F16H 37/02; F16H 47/08; F16H 61/04
(52) U.S. Cl. .......................... 475/210; 477/46; 474/18
(58) Field of Search .............................. 474/18, 28, 8, 474/11; 477/49, 48, 45; 475/210

(56) References Cited

U.S. PATENT DOCUMENTS

| | | |
|---|---|---|
| 4,990,126 A | 2/1991 | Ideta et al. |
| 5,032,108 A | 7/1991 | Taniguchi et al. |
| 5,295,920 A * | 3/1994 | Sawasaki et al. ............ 475/210 |
| 5,908,367 A * | 6/1999 | Tominaga et al. ............ 477/45 |
| 5,997,430 A * | 12/1999 | Tanabe ........................ 477/46 |

FOREIGN PATENT DOCUMENTS

| | | |
|---|---|---|
| EP | 0 315 816 A | 5/1989 |
| EP | 0 373 490 A | 6/1990 |
| JP | 3-204456 * | 9/1991 |
| JP | 10274319 A | 10/1998 |

* cited by examiner

*Primary Examiner*—David A. Bucci
*Assistant Examiner*—Marcus Charles

(57) ABSTRACT

A forward-speed/reverse-speed changeover mechanism 6, serving as a motive-force connection/disconnection mechanism, is accommodated into a housing member 8 fixed to a casing 1. To the forward-speed/reverse-speed changeover mechanism 6 an input end of a primary shaft 3 is connected. The housing member 8 rotatably supports the primary shaft 3 via a bearing member 11. On an imaginary line intersecting the primary shaft 3 perpendicularly and passing through the bearing member 11, a load-receiving element 1b, 8b is provided between the housing member 8 and the casing 1. The tension of a belt 17 is received by the load-receiving element 1b, 8b. As a result, it is possible to provide a bearing structure of a continuously variable transmission enabling holding the bearing members of the primary and secondary shafts at their regular positions against the tension of the belt and maintaining an optimum belt-alignment, thereby enhancing the durability of the continuously variable transmission.

10 Claims, 5 Drawing Sheets ously variable transmission is constructed in such a way that a primary shaft and a secondary shaft are disposed in parallel with each other within a casing, and an endless belt is suspended between a primary pulley provided on the primary shaft and a secondary pulley provided on the secondary shaft. The primary pulley and the secondary pulley are each constructed of a fixed sheave and a movable sheave. The movable sheave is made movable by an actuator in the axial direction. By the oil-pressure, etc. supplied to the actuator, the spacing between corresponding ones of the sheaves is adjusted such that the speed-change ratio can be varied continuously.

CONTINUOUSLY VARIABLE TRANSMISSION

BACKGROUND OF THE INVENTION

1. Field of the Invention

The present invention relates to a continuously variable transmission equipped with a forward-speed/reverse-speed changeover mechanism.

2. Description of the Related Art

As a technique associated with this type of continuously variable transmission, a belt-type continuously variable transmission disclosed in JP-A-10-274319 can be given as an example. The transmission mechanism of this continuously variable transmission is constructed in such a way that a primary shaft and a secondary shaft are disposed in parallel with each other within a casing, and an endless belt is suspended between a primary pulley provided on the primary shaft and a secondary pulley provided on the secondary shaft. The primary pulley and the secondary pulley are each constructed of a fixed sheave and a movable sheave. The movable sheave is made movable by an actuator in the axial direction. By the oil-pressure, etc. supplied to the actuator, the spacing between corresponding ones of the sheaves is adjusted such that the speed-change ratio can be varied continuously.

The drive force of an engine is transmitted to a drive-wheel side sequentially through a torque converter, an input shaft that is a rotating shaft, a forward-speed/reverse-speed changeover mechanism comprised of a planetary-gear mechanism, connected to an output side of the input shaft, the above-described speed-change mechanism, differential gears, etc.

The rotation of a turbine runner, output from the torque converter, is output to the primary shaft by being selectively changed over, through the forward-speed/reverse-speed changeover mechanism, to either one of a normal rotating direction (the forward direction of the vehicle) or a reverse rotating direction (the reverse direction of the vehicle).

Incidentally, the concrete construction is as follows. First, the input shaft is connected to the turbine runner, and the input shaft has a sun gear on the outer-periphery of its output side. Also, the planetary-gear mechanism includes pinion gears, a carrier, and a ring gear. The pinion gears mesh with the sun gear and the carrier is connected to an input side of the primary shaft. Among these members, the carrier and the input shaft are mutually connectable or disconnectable by a clutch. Also, the rotation of the ring gear can be regulated by a brake. By controlling operations of the clutch and brake independently, it is possible to change the rotating direction of the carrier, i.e. the rotating direction of the primary shaft to the normal or reverse rotating direction with respect to the input shaft.

As illustrated in FIG. 5, the continuously variable transmission disclosed in the Japanese Patent Publication is constructed in such a form wherein a casing 101 is formed by connecting a main casing 101a and a sub-casing 101b. The above-described forward-speed/reverse-speed changeover mechanism 102 is incorporated into a brake support 104 shaped like a cup flared from and about the primary shaft 103. The brake support 104 is disposed within the main casing 101a in a state of being supported by the sub-casing 101b by means of bolts 105. An input end of the primary shaft 103 is connected to the carrier of the forward-speed/reverse-speed changeover mechanism 102. Also, the input end of the primary shaft 103 is rotatably supported by the brake support 104 through a bearing 106.

In the belt-type continuously variable transmission, a strong clamping force is imparted to the pulley for the purpose of preventing the slip of the belt. For this reason, the tension of the belt is necessarily increased with the result that a force causing the primary shaft and the secondary shaft to move toward each other acts upon these shafts. As a result, a high magnitude of load acts upon the bearings as well that support the primary and secondary shafts.

On the other hand, as apparent from the figure (FIG. 5), the bearing 106 for supporting one end (the rightward end in the figure) of the primary shaft 103 is supported, as if it were a cantilever, by the sub-casing 101b through the brake support 104. However, there was the problem that, due to the above-described tension of the belt, the brake support 104 was flexed and resultantly the bearing 106 shifted out of its regular position. As a result of this, the belt became misaligned and partial (uneven) contacts thereof occurred, with the result that the cone surface of the belt or pulley (the surface or surfaces over which the belt makes its contact with the pulley) became deteriorated in a short period of time.

Also, this belt-type continuously variable transmission has a structure that two members share the function of the input shaft. The detailed construction is as follows. First, as illustrated in FIG. 5, a reaction shaft support 101c, connected to the sub-casing 101b, is extended to the not-illustrated torque converter side (the rightward side in the figure) along an outer surface of the input shaft 107, and supports a stator of the torque converter. Further, one end (the rightward end in the figure) of the input shaft 107 is supported by the sub-casing 101b via the reaction shaft support 101c and a not-illustrated bearing provided between the reaction shaft support 101c and the input shaft 107. Also, the other end (the leftward end in the figure) of the input shaft 107 is supported by the brake support 104 via the bearing 106, the primary shaft 103, and the bearing 27 provided between the primary shaft 103 and the input shaft 107.

Here, the reaction shaft support 101c and the brake support 104 are positioned with respect to the sub-casing 101b. However, each of the bearing for supporting the one end (the rightward end in the figure) of the input shaft 107, the bearing 106 for supporting the one end (the rightward end in the figure) of the primary shaft 103, and the bearing 27 provided between the primary shaft 103 and the input shaft 107 contains the part-precision error and assembling error within a prescribed permissible range. For this reason, the center axes of these bearings are not in coincidence with one another, with the result that there was the problem of the input shaft 107 becoming deteriorated in terms of the centering precision. It is to be noted that it is difficult, with an ordinary attaching operation, to cause the center axes of these bearings to coincide with one another with high precision. So, there was conventionally a certain limit to enhance the centering precision of the input shaft 107.

SUMMARY OF THE INVENTION

An object of the present invention is to provide a continuously variable transmission that can maintain the bearing members of the primary and secondary shafts at their regular positions despite the tension or tensile force of the belt, and maintains the belt alignment as it is being apt, thereby enhancing the durability, especially a bearing structure of the belt-type continuously variable transmission.

Another object of the present invention is to provide a continuously variable transmission that can obtain the centering precision of each rotating shaft at very high accuracy.

To attain the above object, according to the first aspect of the present invention, there is provided a continuously variable transmission including, within a casing, a continuously variable transmission mechanism that includes a primary pulley provided on a primary shaft, a secondary pulley provided on a secondary shaft, and a belt suspended between both pulleys and enabling the transmission of a motive force between the pulleys, and that, by changing-the groove width of one of the primary pulley and secondary pulley relative to the groove width of the other, enables continuous adjustment of the speed-change ratio, and a motive-force connection/disconnection mechanism that, by being connected to either one of the primary shaft and the secondary shaft, enables connection/disconnection between an input side element for the motive force and an output side element for the motive force, the continuously variable transmission comprising, a housing member fixed within the casing and that accommodates therein the motive-force connection/disconnection mechanism and rotatably supports, via a bearing member, the one of the primary shaft and the secondary shaft that has been connected to the motive-force connection/disconnection mechanism, and a load-receiving element that is provided on an imaginary line that perpendicularly intersects the one of the primary shaft and the secondary shaft and passing through the bearing member or a vicinity thereof and, between the housing member and the casing member, and receives a force acting upon the housing member toward the side of the other of the primary shaft and the secondary shaft.

The tension of the belt of the continuously variable transmission acts upon the primary shaft and the secondary shaft. Therefore, a force that acts toward the other-shaft side from the one shaft thereof via the bearing member also acts upon the housing member for supporting one of those shafts. Accordingly, this housing member is required to have a rigidity high enough to hold the bearing member at its regular position against the tension of the belt. That force which acts upon the housing member is directly received by the load-receiving element that is provided on the imaginary line that perpendicularly intersects the one of the primary shaft and the secondary shaft and passes through the bearing member or a vicinity thereof, between the housing member and the casing member. As a result of this, the housing member is prevented from being flexed and resultantly it becomes possible to hold the bearing member at its regular position.

Also, according to the second aspect of the invention, there is provided a continuously variable transmission wherein the load-receiving element is formed at least at a position opposing the side of said other of the primary shaft and the secondary shaft.

Accordingly, in the case where the motive-force connection/disconnection mechanism is connected to the primary shaft, the force acting toward the secondary shaft side works upon the housing member for supporting the primary shaft via the bearing member. However, because the load-receiving element is formed at least at the position opposing the secondary shaft side, the force acting upon the housing member toward the secondary shaft side is reliably received by the load-receiving element. Resultantly, the bearing member can be held at its regular position. On the other hand, in the case where the motive-force connection/disconnection mechanism is connected to the secondary shaft, because the load-receiving element is formed at least at the position opposing the primary shaft side, the force acting upon the housing member toward the primary shaft side is similarly received by the load-receiving element. Resultantly, the bearing member can be held at its regular position.

Also, according to the third aspect of the invention, there is provided a continuously variable transmission wherein the load-receiving element is constructed of an inner-peripheral portion of the casing and an outer-peripheral portion of the housing member that engages the inner-peripheral portion of the casing.

Accordingly, it is possible to construct the load-receiving element simply without using any other parts therefor.

Also, according to the fourth aspect of the invention, there is provided a continuously variable transmission including a rotating shaft that rotates upon receipt of a driving force from a driving source, a rotation changeover mechanism that has a gear mechanism connected to the rotating shaft and that enables changing of the rotating direction of an output shaft via this gear mechanism, and a speed-change mechanism that transmits the driving force from the driving source to the output shaft by continuously changing the rotation speed thereof, the continuously variable transmission comprising a support member that rotatably supports a one-end side of the rotating shaft, a case member that accommodates, therein, the rotation changeover mechanism and that rotatably supports an other-end side of the rotating shaft, and a fixing element provided between the support member and the case member and attaching the support member to the case member as well as positioning the support member with respect to the case member.

Accordingly, the support member is directly positioned with respect to the case member. Therefore, as the support member is attached, the centers of the bearings can be made to coincide with one another through the intermediary of those two members with high precision. The centering precision of the rotating shaft is thereby greatly enhanced. Also, as a result of this, it is possible to lessen the intermeshing error of the gear mechanism (the forward-speed/reverse-speed changeover mechanism) connected to the rotating shaft. It is to be noted that, preferably, for example, a socket/spigot joint or knock-pin can be used as the fixing element.

DESCRIPTION OF THE PREFERRED EMBODIMENT

A preferred embodiment wherein the present invention is embodied as a belt-type continuously variable transmission used in an FF (front-engine/front-drive) vehicle will now be explained.

Figure 1:
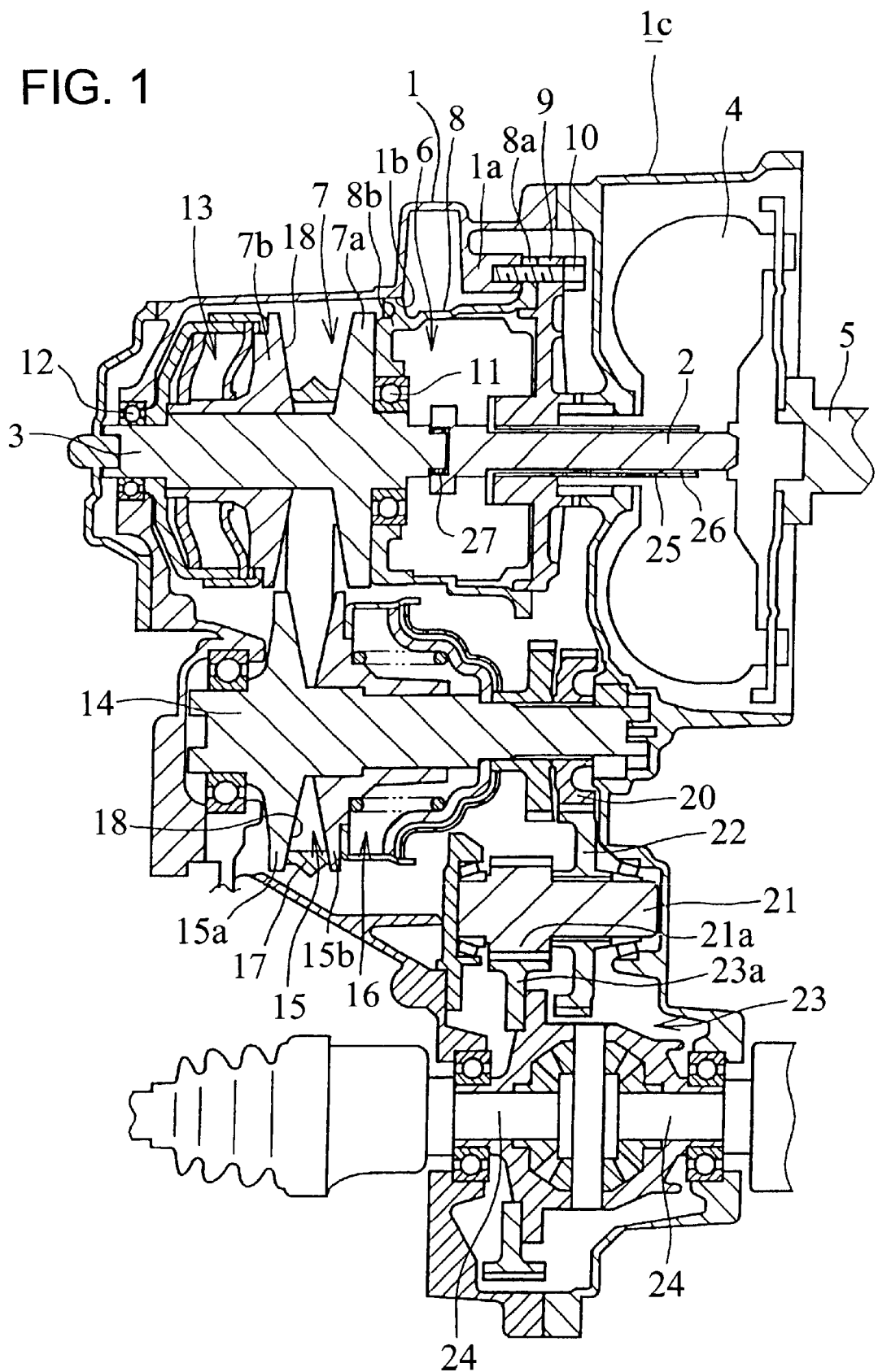
FIG. 1 is a sectional view of a continuously variable transmission according to a preferred embodiment of the resent invention.

FIG. 1 illustrates a cross section of a belt-type continuously variable transmission. In this belt-type continuously variable transmission, a torque converter 4 is connected to an input side (the rightward side in the figure) of this transmission, and a known pump impeller (not illustrated) of the torque converter is connected to a crank shaft 5 of an engine.

Within a casing 1 of the continuously variable transmission, there are accommodated the torque converter 4, an input shaft (rotating shaft) 2 which one end (the rightward end in the figure) is spline-connected to a turbine runner (not illustrated) of the torque converter 4, a forward-speed/reverse-speed changeover mechanism 6 connected to the other end (the leftward end in the figure) of the input shaft 2 and served as a motive-force connection/disconnection mechanism as later described, a primary shaft 3 connected to an output portion of the forward-speed/reverse-speed changeover mechanism 6 and disposed on the same axis as that of the input shaft 2, a primary pulley 7 of a speed-change mechanism disposed on the primary shaft 3, a secondary shaft 14 disposed in parallel with the primary shaft 3, a secondary pulley 15 of the speed-change mechanism disposed on the secondary shaft 14, and an endless metal belt 17 of the speed-change mechanism suspended between the primary pulley 7 and the secondary pulley 15, etc.

Figure 2:
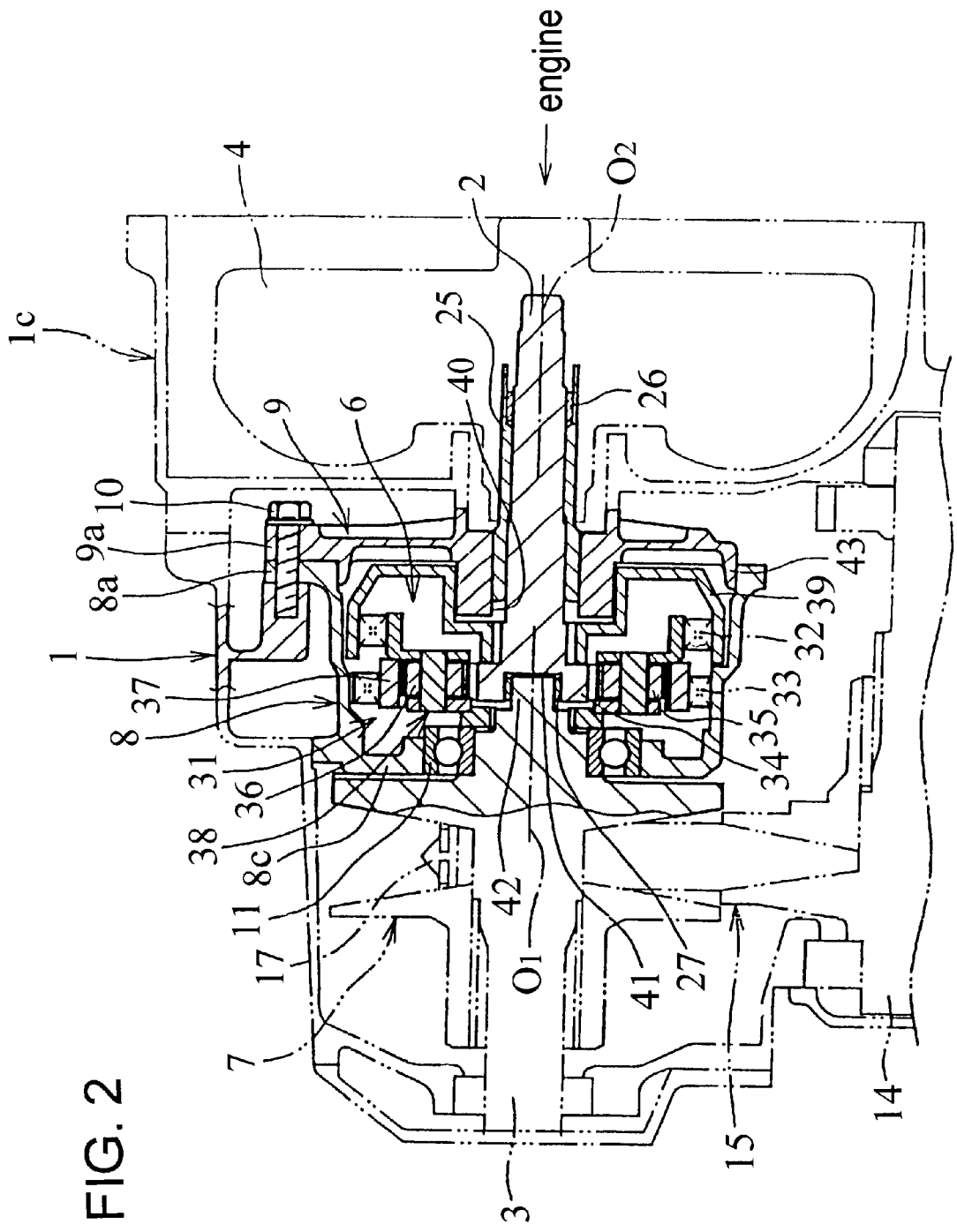
FIG. 2 is an enlarged view of a main part of the continuously variable transmission apparatus of FIG. 1.

As illustrated in FIG. 2, the above-described forward-speed/reverse-speed changeover mechanism 6 is equipped with a double-pinion type planetary-gear mechanism 31, a clutch 32, and a brake 33. The forward-speed/reverse-speed changeover mechanism 6 thereby has the function of changing the rotating direction of the input shaft 2 to one of a normal direction and a reverse direction and outputting that rotation to the primary shaft 3 and the function of performing the connection/disconnection between the input shaft 2, which is an input side element of the motive force, and the primary shaft 3, which is an output side element of the motive force.

The other end (the leftward end in the figure) of the input shaft 2 has formed thereon a sun gear 34 constituting the planetary-gear mechanism 31, with which one pinion gear 35 is meshed. The other pinion gear 36 is meshed with the pinion gear 35 and a ring gear 37. A carrier 38 that rotatably supports these pinion gears 35 and 36 is connected to one end (the rightward end in the figure) of the primary shaft 3. Also, the carrier 38 can be connected to or disconnected from the input shaft 2 via the clutch 32. A reference numeral 39 denotes a clutch retainer that accommodates therein a piston (not illustrated) that operates the clutch 32. The clutch retainer 39 constitutes a clutch actuator in cooperation with the piston.

Here, the forward-speed/reverse-speed changeover mechanism 6 is accommodated within a brake support 8 that serves as a housing member, which forms a substantially hollow-cylindrical case member and fixedly disposed within the casing 1. The brake 33 is arranged between an inner-peripheral surface of the brake support 8 and the ring gear 37. The ring gear 37 is fixed to the brake support 8 through the operation of the brake 33, whereby the rotation thereof is regulated.

The brake support 8 accommodates therein the forward-speed/reverse-speed changeover mechanism 6, and also rotatably supports one end (the rightward end in the figure) of the primary shaft 3 and the other end (the leftward end in the figure) of the input shaft 2. The concrete construction is as follows. First, the primary shaft 3 passes through one end wall 8c on the primary pulley 7 side of the brake support 8, and a ball bearing 11, which serves as a bearing member, is disposed between the primary shaft 3 and the one end wall 8c.

Also, the primary shaft 3 and the input shaft 2 are disposed along the same axial line. In the input shaft 2, there is formed a socket hole 41 that is recessed axially from the other end surface of that input shaft 2. On the other hand, one end (the rightward end in the figure) portion 42 of the primary shaft 3 has its diameter stepwise reduced, and this diameter-reduced one end portion 42 is inserted into the socket hole 41. A bearing 27 is disposed between the inner-peripheral portion of the input shaft 2 having the socket hole 41 formed therein and the diameter-reduced one end portion 42 of the primary shaft 3.

Accordingly, the brake support 8 supports the one end (the rightward end in the figure) side of the primary shaft 3 via the bearing 11 and supports the other end (the leftward end in the figure) of the input shaft 2 via the ball bearing 11, primary shaft 3, and bearing 27.

Also, the brake support 8 is open toward a torque converter housing 1c that accommodates the torque converter 4 therein. To the brake support 8 is attached a reaction shaft support (support member) 9 that closes this opening.

The reaction shaft support 9 has an oil-hydraulic circuit for supplying an operating oil to the above-described clutch actuator while the support 9 rotatably supports the one end (the rightward end in the figure) of the input shaft 2. The concrete construction is as follows. First, the reaction shaft support 9 has a through-hole 40 formed at the center thereof, and the input shaft 2 passes through the through-hole 40. The reaction shaft support 9 has a sleeve 25 which one end (the leftward end in the figure) thereof engages with the inner-peripheral surface of the through-hole 40 and extends and protrudes into the torque converter housing 1c along an outer surface of the input shaft 2. It is to be noted that an outer periphery of the sleeve 25 is connected a stator (not illustrated) of the torque converter 4 via a one-way clutch (not illustrated). Between an inner periphery of the sleeve 25 and the input shaft 2, a bearing 26 is disposed. Namely, the reaction shaft support 9 is arranged to support the one end (the rightward end in the figure) side of the input shaft 2 via the sleeve 25 and the bearing 26.

As illustrated in FIG. 1, the primary pulley 7 is constructed of a fixed sheave 7a integrally formed on the primary shaft 3 and a movable sheave 7b provided in such a way as to be movable on the primary shaft 3. The movable sheave 7b is arranged to move toward or away from the fixed sheave 7a by the oil-hydraulic actuator 13. As in the case of the primary pulley 7, the secondary pulley 15 is constructed of a fixed sheave 15a integrally formed on the secondary shaft 14 and a movable sheave 15b provided in such a way as to be movable on the secondary shaft 14. The movable sheave 15b is arranged to move toward or away from the fixed sheave 15a by the oil-hydraulic actuator 16.

An endless metal belt 17 suspended between the primary pulley 7 and the secondary pulley 15 is clamped within V-shaped grooves 18 formed between the fixed sheaves 7a, 15a and their corresponding movable sheaves 7b, 15b to transmit the rotation of the primary pulley 7 to the secondary pulley 15.

The respective movable sheaves 7b, 15b of the primary pulley 7 and secondary pulley 15 are always driven by their corresponding oil-hydraulic actuators 13, 16 in mutually opposite directions, such that when the effective diameter of one of the primary pulley 7 and secondary pulley 15 increases, the effective diameter of the other thereof decreases. When the effective diameter of the primary pulley 7 is larger than that of the secondary pulley 15, the change-of-speed ratio is transferred to a high-speed (over-drive) side. Conversely, when the effective diameter of the primary pulley 7 is smaller than that of the secondary pulley 15, the change-of-speed ratio is transferred to a low-speed (lowdrive) side. In this embodiment, the primary pulley 7, secondary pulley 15, and metal belt 17 constitute the continuously variable transmission mechanism.

A transfer drive gear 20, which is meshed with a transferred drive gear 22 that is spline-connected onto a transfer shaft 21 serving as an output shaft, is spline connected onto the secondary shaft 14. An output gear 21a is integrally formed on the transfer shaft 21, and the output gear 21a is meshed with a final gear 23a of a differential mechanism 23. This differential mechanism 23 is connected to right and left drive wheels, not illustrated, via drive shafts 24.

Figure 3:
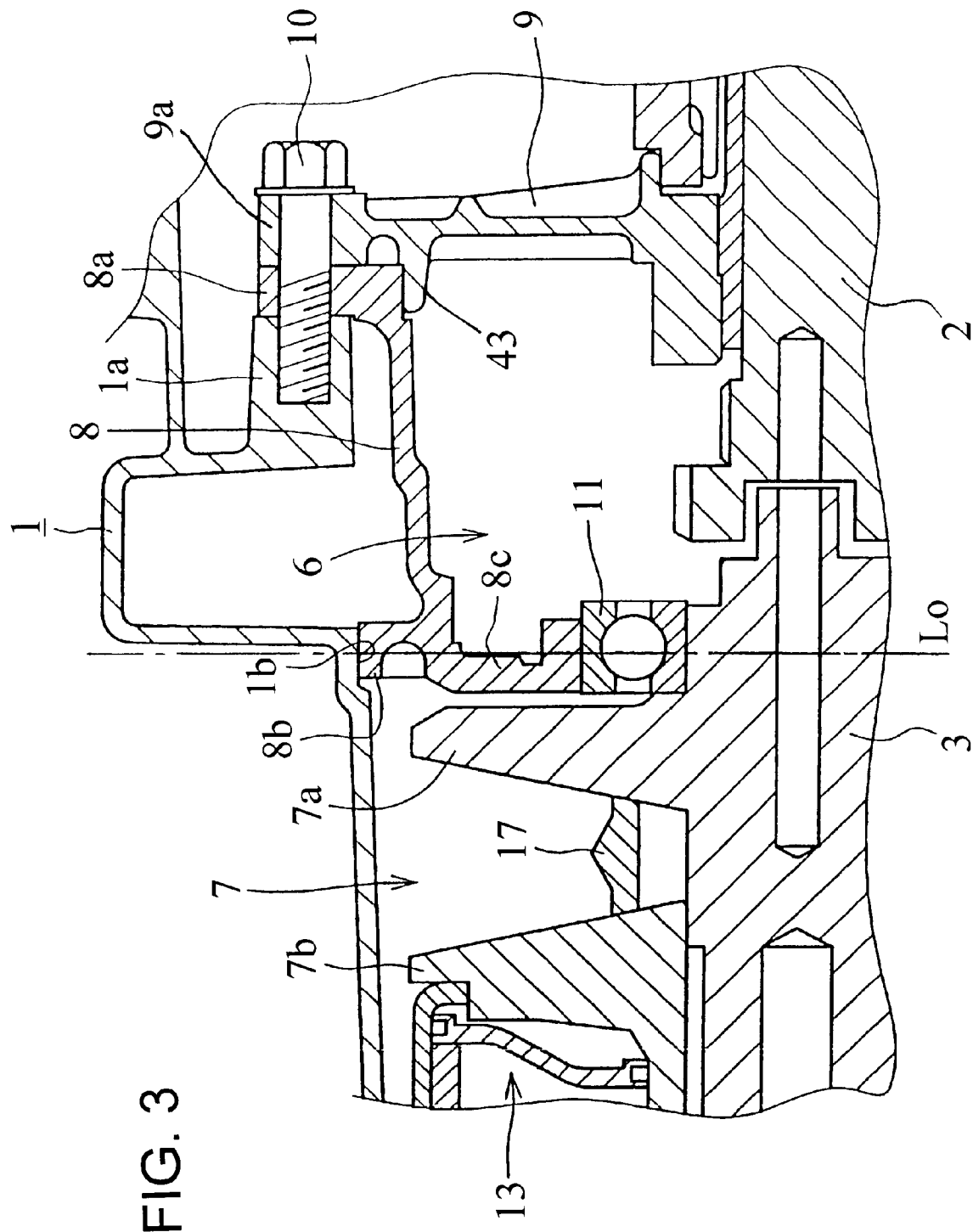
FIG. 3 is a partial cross-sectional view showing an assembled state of a brake support within the casing.

On the other hand, in FIG. 3, an assembled state of the brake support 8 to the casing 1 is illustrated. As illustrated in this figure, the brake support 8 has a flange portion 8a formed on the outer periphery thereof on its torque converter side (the right side in the figure). The flange portion 8a overlaps an outer-peripheral portion 9a of the reaction shaft support 9 and the flange portion 8a and the reaction shaft support 9 are jointly fixed to an attaching portion la within the casing 1 by means of bolts 10.

The brake support 8 also has a socket/spigot outer-peripheral portion 8b shaped like a flange formed on the outer periphery on the primary pulley 7 side (the left side in the figure) thereof. The socket/spigot outer-peripheral portion 8b is disposed on an imaginary line L0 that perpendicularly intersects the axial line of the primary shaft 3 and that passes through the bearing 11. In other words, the socket/spigot outer-peripheral portion 8b is disposed in a plane that perpendicularly intersects the axis of the primary shaft 3 and passes through the bearing 11. It is to be noted that the perpendicular-intersection line L0 is set within a range between the both ends in the axial direction of the bearing 11. Also, the socket/spigot outer-peripheral portion 8b need not always be disposed on the perpendicular-intersection line L0 and may be disposed in the vicinity of the perpendicular-intersection line L0.

Figure 4:
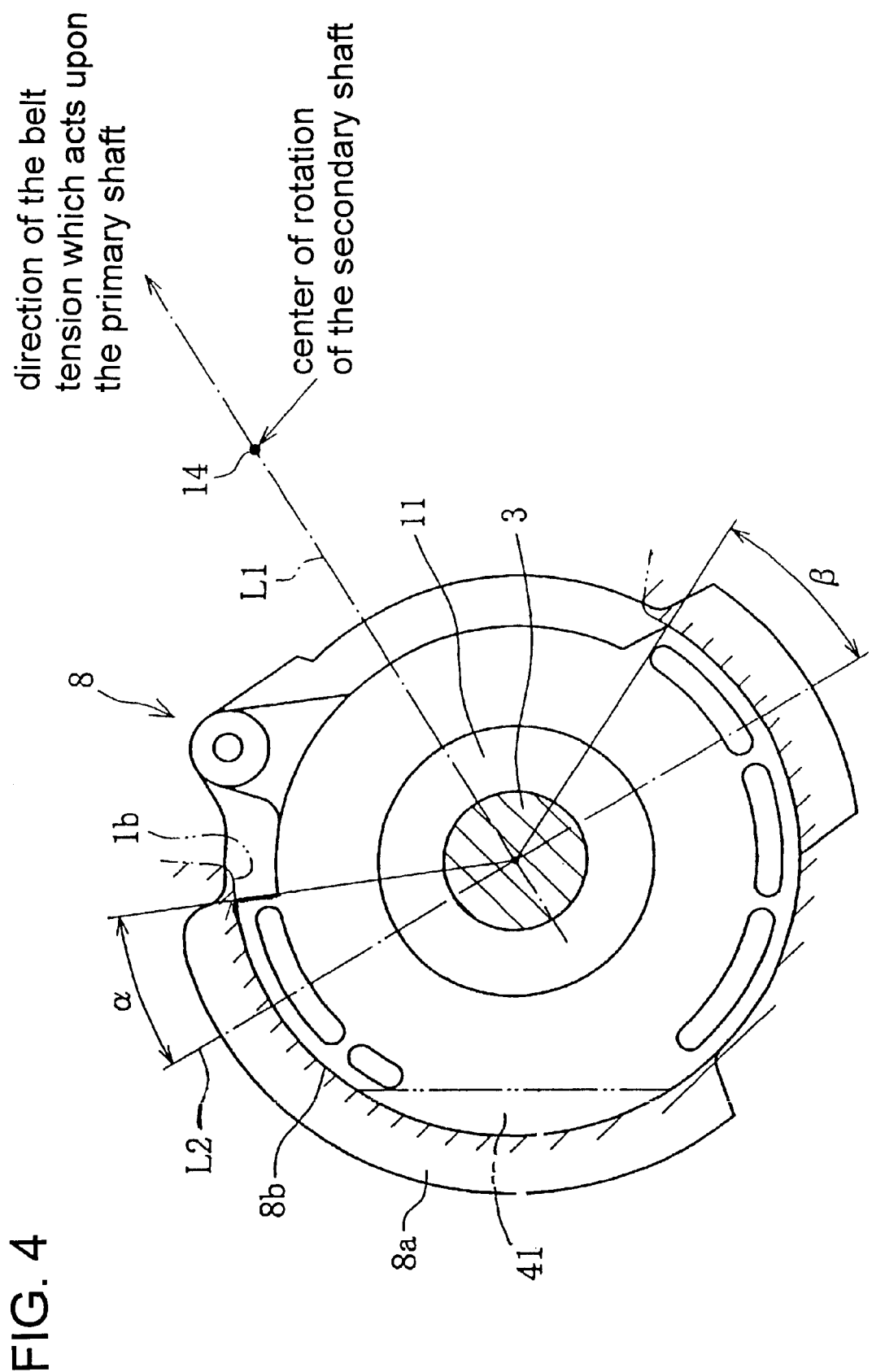
FIG. 4 is an explanatory view of a position over which a socket/spigot outer-peripheral portion is formed in the peripheral direction.

FIG. 4 illustrates the front-surface configuration of the brake support 8 and the formed position in the peripheral direction of the socket/spigot outer-peripheral portion 8b. With reference to this figure, the formed position of the socket/spigot outer-peripheral portion 8b will now be explained. First, when viewed in an axial direction, a line that passes through the center of rotation of the primary shaft 3 and that of the secondary shaft 14 is assumed as a first imaginary straight line L1. Next, a line that perpendicularly intersects the imaginary straight line L1 and the axial line of the primary shaft 3 and that passes through the center of rotation of the primary shaft 3 is assumed as a second imaginary straight line L2. When dividing the outer periphery of the brake support 8 into a secondary shaft 14 side and a opposite side of the secondary shaft 14 by that second imaginary straight line L2, the socket/spigot outer-peripheral portion 8b is formed over the entire region on the opposite side of the secondary shaft 14. Also, the socket/spigot outer-peripheral portion 8b extends on the secondary shaft 14 side as well by the extents corresponding to angles α and β. Namely, the socket/spigot outer-peripheral portion 8b is formed at the positions that are biased and opposed to the secondary shaft 14 side by the extents corresponding to the angles α and β.

The socket/spigot outer-peripheral portion 8b is fitted to a socket/spigot inner-peripheral portion 1b formed on an inner wall of the casing 1, which, as illustrated by hatching in FIG. 4, is formed over a region that, in the peripheral direction, corresponds to the socket/spigot outer-peripheral portion 8b.

In this embodiment, a socket/spigot portion constructed of this socket/spigot outer-peripheral portion 8b and socket/spigot inner-peripheral portion 1b constitutes a load-receiving element.

By the way, in the belt-type continuously variable transmission, for the purpose of preventing the slip of the metal belt 17, strong clamping forces are at all times imparted to the pulleys 7 and 15 by the oil-hydraulic actuators 13 and 16. The tension of the metal belt 17 that results from such strong clamping forces acts in a direction moving the primary shaft 3 and secondary shaft 14 toward each other. Because the one end (the rightward end in the figure) portion of the primary shaft 3 is supported by the brake support 8 via the bearing 11, the above-described tension of the belt directed to the secondary shaft 14 side acts upon the brake support 8 via the bearing 11. Accordingly, the brake support 8 is demanded to have a rigidity high enough to hold the bearing 11 at its regular position against the tension of the metal belt 17.

Here, as stated above, the socket/spigot outer-peripheral portion 8b of the brake support 8 is fitted to the socket/spigot inner-peripheral portion 1b of the casing 1 in the state of being extended to the secondary shaft 14 side from the second imaginary straight line L2. By this extended portion (the portions corresponding to the angles α and β), the socket/spigot outer-peripheral portion 8b resists the tension of the metal belt 17 acting toward the secondary shaft 14.

Namely, in this embodiment, the brake support 8 is not only fixed on the attaching portion 1a of the casing 1, at its flange portion 8a on the torque converter 4 side, but also positioned with respect to the casing 1 at the socket/spigot outer-peripheral portion 8b formed between the support 8 and the casing 1, on the perpendicular-intersection line L0 passing through the bearing 11 rotatably supporting the primary shaft 3 and orthogonally intersecting the axial line thereof.

Namely, the socket/spigot portion constructed of this socket/spigot outer-peripheral portion 8b and socket/spigot inner-peripheral portion 1b makes radial positioning of the one end wall 8c of the brake support 8. Accordingly, the tension or pulled force of the belt toward the secondary shaft 14 acting upon the one end (the rightward end in the figure) of the primary shaft 3 is borne by this socket/spigot portion via the bearing 11 and the one end wall 8c of the brake support 8. As a result of this, the brake support 8 has suppressed its flexure caused due to the tension or pulled force of the belt.

Figure 5:
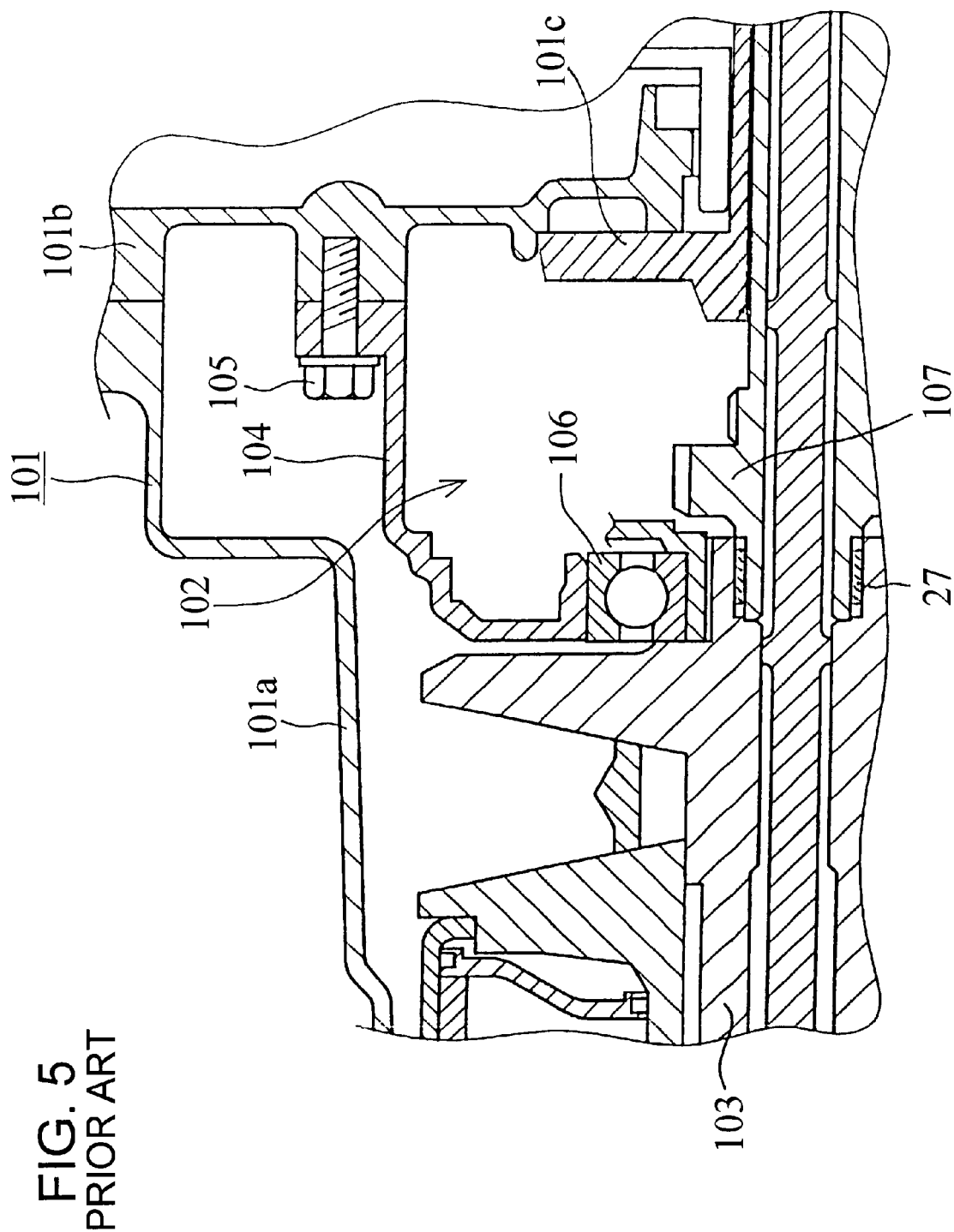
FIG. 5 is a partial cross-sectional view showing an assembled state of a brake support of a conventional belt-type continuously variable transmission apparatus.

Accordingly, compared with the case wherein as in the conventional example of FIG. 5 the brake support 104 is fixed, as if it were a cantilever, to the sub-casing 101b only on the torque converter side, the rigidity of the brake support 8 is greatly increased and resultantly the flexure thereof is suppressed. As a result of this, the bearing 11 can be reliably held at its regular position. This enables the belt to be always maintained at its optimum alignment, thereby preventing the occurrence of an inconvenience caused by partial contacts of the metal belt 17, e.g. early deterioration of the metal belt 17 and the cone surface of pulleys 7, 15. This leads even to enhancing the durability of the continuously variable transmission.

On the other hand, because, as illustrated in FIG. 1, the other end (the leftward end in the figure) of the primary shaft 3 is supported by the casing 1 via the bearing 12, it is also necessary to make positioning of the one end (the rightward end in the figure) of the primary shaft 3 with respect to the casing 1 at a position taken in the radial direction.

In this embodiment, as stated above, the brake support 8 is directly positioned by the socket/spigot portion 1b, 8b with respect to the casing 1. Therefore, compared with the case wherein as in the conventional example of FIG. 5 the brake support 104 is positioned with respect to the main casing 101a (corresponding to the casing 1 of this embodiment) via the sub-casing 101b, the positional precision of the brake support 8 is increased.

Namely, the one end (the rightward end in the figure) of the primary shaft 3 is positioned with respect to the casing 1 at the position taken in the radial direction. In consequence, the both ends of the primary shaft 3 are positioned with respect to the casing 1. In consequence, the centering precision of the primary shaft 3 is enhanced. In consequence, there is also the effect of enabling more aptly realizing the above-described belt alignment.

Also, in this embodiment, as illustrated in FIG. 3, the attaching of the reaction shaft support 9 with respect to the rake support 8 is performed by the fitting thereof to the opening end of the brake support 8, i.e. the socket/spigot joint (fixing element). The concrete construction is as follows. First, the reaction shaft support 9 has an annular insertion rib 43 formed on its surface opposing the brake support 8. The opening edge of the brake support 8 is formed as an insertion opening. The insertion rib 43 of the reaction shaft support 9 is fitted into the opening edge of the brake support 8.

As stated above, if the reaction shaft support 9 is connected to the brake support 8 by means of the socket/spigot joint, the resulting attaching thereof is followed by simultaneous positioning of each of those supports. Accordingly, through such positioning, it is possible to bring into highly precise coincidence with each other the center $O_1$ on the one-end side of the primary shaft 3 supported by the brake support 8, and the center $O_2$ on the one-end side of the input shaft 2 supported by the reaction shaft support 9. As a result of this, the centering precision of the input shaft 2 is greatly enhanced, and, simultaneously, the intermeshing error of the sun gear 34 integrally formed on the input shaft 2 and the pinion gear 35 can be decreased. Therefore, a further advantage is procured of enabling simultaneous decrease in the unusual sounds resulting from a defective intermeshing of those gears.

In the above-described embodiment, the invention has been embodied as a continuously variable transmission for use on an FF type vehicle. However, the type of the vehicle to which the invention is applied is not limited thereto, but the invention may be embodied, for example, in the bearing structure of a continuously variable transmission for use on an FR (front-engine/rear-drive) type vehicle.

Incidentally, the object to which the continuously variable transmission of the invention is to be applied is not limited to the use purpose for a vehicle but this object can of course be any other use purposes as well.

Also, in the above-described embodiment, it has been arranged that the socket/spigot portion 1b, 8b for receiving the load from the brake support 8 be extended from the entire region on the counter-to-secondary-shaft 14 side of the brake support 8 toward the secondary shaft 14 side by the extents corresponding to the angles α and β. It has been thereby arranged that these extended portions bear the pulled force or tension of the metal belt 17.

However, it is to be noted that by at least providing the socket/spigot portion 1b, 8b biased toward the secondary shaft 14 side from the second imaginary straight line L2, this will sufficiently serve the purpose. Namely, if the socket/spigot portion 1b, 8b is provided at the position opposing the secondary shaft 14 side, the same function and effect or advantage as those stated previously can be obtained. Accordingly, for example, as indicated in a two-dot chain line in FIG. 4, by forming a cutout portion 41 on the counter-to-secondary-shaft 14 side of the socket/spigot outer-peripheral portion 8b, this socket/spigot outer-peripheral portion 8b may be partly abolished. If the socket/spigot portion is constructed like this, the weight of the brake support 8 can be reduced which leads to reduction of weight of the continuously variable transmission.

Also, in the socket/spigot joint connecting the brake support 8 and the reaction shaft support 9 according to the above-described embodiment, with respect to which one of the brake support 8 and the reaction shaft support 9 the insertion opening or insertion rib 43 should be formed is at one's choice. No particular limitation exists in terms of the choice. Further, this socket/spigot joint may be formed using a knock-pin or realized by screwing.

Additionally, in the above-described embodiment, an explanation has been given of the belt-type continuously variable transmission. However, the structure of the socket/spigot joint used between the brake support 8 and the reaction shaft support 9 is not limited to the one that is used on the belt-type continuously variable transmission. Therefore, even when that structure is adopted on any other type of continuously variable transmission that includes, for example, a toroidal type continuously variable transmission, this can bring about the same function and effect.

Further, in the above-described embodiment, the forward-speed/reverse-speed changeover mechanism 6 that has the function of making connection/disconnection, and the function of making rotating-direction changeover, between the input shaft 2 and the primary shaft 3 was used as the motive force connection/disconnection mechanism. However, as in the case of the a start clutch, the motive-force connection/disconnection mechanism may be made to have a construction equipped with only the connection/disconnection function that makes connection/disconnection between the input side element and the output side element of the motive force. Incidentally, this forward-speed/reverse-speed changeover mechanism 6 may be constructed of a speed-change transmission having a plurality of fixed speed-change stages. Also, the forward-speed/reverse-speed changeover mechanism 6 is not limited to the planetary-gear mechanism 31 of the embodiment, but may be a single-pinion type or synchromesh type changeover mechanism.

Also, in the above-described embodiment, the forward-speed/reverse-speed changeover mechanism 6 has been provided on the input side of the primary shaft 3 to thereby support the input end of the primary shaft 3 by the brake support 8. However, it may be arranged that, for example, the forward-speed/reverse-speed changeover mechanism 6 be provided on the output side (the right side of FIG. 1) of the secondary shaft 14, whereby the output end of the secondary shaft 14 is supported via a bearing by a brake support accommodating therein the forward-speed/reverse-speed changeover mechanism 6.

Also, in the above-described embodiment, the drive force from the engine is transmitted, via the torque converter 4, to the input shaft 2, to which the forward-speed/reverse-speed changeover mechanism 6 is connected. However, it may be arranged that, for example, the drive force from the engine be transmitted via an electromagnetic clutch to the input shaft 2 to thereby make a construction wherein the motive force is transmitted thereto without intermediary of the torque converter 4. In this case, also, it is sufficient to make the following construction. Namely, between the brake support 8 constituting the housing member that accommodates therein the forward-speed/reverse-speed changeover mechanism 6 to thereby rotatably support the input end of the primary shaft 3 via the bearing 11 and the casing 1, there is provided the socket/spigot portion serving as the positioning element for positioning the brake support 8 with respect to the casing 1 at the position taken in the radial direction. This construction enables obtaining the same function and effect as those attainable with the above-described embodiment.

It is to be noted that the mode of the invention is not limited to the above-described such embodiment.

As has been described above, in the continuously variable transmission according to the first aspect of the present invention, the load-receiving member is provided on an imaginary line, or in the vicinity thereof, perpendicularly intersecting one of the primary shaft and the secondary shaft and passing through the bearing member for supporting this one shaft, and between the housing member and the casing, there has been provided the load-receiving member. Therefore, the flexure of the brake support 8 that occurs due to the tension of the belt is suppressed with the result that it is possible to hold the bearing member at its regular position. It is, therefore, possible to maintain the belt alignment as it is being apt, thereby enhancing the durability of the continuously variable transmission.

Also, in the continuously variable transmission according to the second aspect of the invention, the load-receiving element is formed at least at a position opposing the other of the primary shaft and the secondary shaft. Therefore, the bearing member can be held at its regular position against the tension of the belt.

Also, in the continuously variable transmission according to the third aspect of the invention, because the load-receiving element directly engages the outer-peripheral portion of the housing member with the inner-peripheral portion of the casing, it is possible to construct the load-receiving element simply without using any other parts therefor.

Also, in the continuously variable transmission according to the fourth aspect of the invention, the centering precision of the rotating shaft can be greatly enhanced only with the attaching operation of the case member to the support member. This is suited to mass-production. Also, it is advantageously possible to increase the intermeshing precision of the input shaft with the gear mechanism connected to the rotating shaft to thereby suppress the generation of the unusual sounds from the intermeshed portions.

What is claimed is:

1. A continuously variable transmission, comprising:
   a casing member;
   a continuously variable transmission mechanism including a primary pulley provided on a primary shaft, a secondary pulley provided on a secondary shaft, and a belt suspended between the primary pulley and the secondary pulley and enabling transmission of a motive force between the primary pulley and the secondary pulley and that, by changing a groove width of one of the primary pulley and secondary pulley relative to a groove width of the other, enables continuous adjustment of a speed-change ratio;
   a motive-force connection/disconnection mechanism that, by being connected to one of the primary shaft and the secondary shaft, enables connection/disconnection between an input side element for the motive force and an output side element for the motive force;
   a housing member fixed within the casing member and accommodating therein the motive-force connection/disconnection mechanism and rotatably supporting via a bearing member the one of the primary shaft and the secondary shaft connected to the motive-force connection/disconnection mechanism;
   a load-receiving element provided at a first side of the motive-force connection/disconnection mechanism and in coincidence with an imaginary line which perpendicularly intersects the one of the primary shaft and the secondary shaft and passes through the bearing member or in the vicinity thereof, to support the housing member with respect to the casing member, and adapted to receive a force acting upon the housing member toward the other one of the primary shaft and the secondary shaft; and
   a support member provided at a second side of the motive-force connection/disconnection mechanism opposite the first side and connected to the housing member.

2. A continuously variable transmission as set forth in claim 1, wherein the load-receiving element is formed at least at a position opposing a side of said the other one of the primary shaft and the secondary shaft.

3. A continuously variable transmission as set forth in claim 1, wherein the load-receiving element is constructed of an inner-peripheral portion of the casing member and an outer-peripheral portion of the housing member engaged with the inner-peripheral portion of the casing member.

4. A continuously variable transmission, comprising:
   a rotating shaft adapted to receive a driving force from a driving source;
   a rotation changeover mechanism connected to the rotating shaft at a first side thereof and enabling changing over of the rotating direction of an output shaft via the gear mechanism;
   a speed-change mechanism that transmits the driving force from the driving source to the output shaft by changing a rotation speed thereof continuously;
   a support member provided at the first side of the speed-change mechanism and rotatably supporting a first end side of the rotating shaft;
   a case member that accommodates therein the rotation changeover mechanism and rotatably supporting a second end side of the rotating shaft at a second side of the speed-change mechanism opposite to the first side; and
   a fixing element adapted to attach the support member to the case member at the first side of the speed-change mechanism and position the case member with respect to the support member.

5. The continuously variable transmission according to claim 4, wherein a first end of the rotating shaft is connected to a torque converter and a second end of the rotating shaft is connected to the speed-change mechanism.

6. The continuously variable transmission according to claim 5, wherein the support member is provided between the torque converter and the speed-change mechanism.

7. The continuously variable transmission according to claim 4, wherein the fixing element includes a socket/spigot joint.

8. The continuously variable transmission according to claim 4, wherein the second end side of the rotating shaft is supported by the case member via a primary shaft of the speed-change mechanism.

9. The continuously variable transmission according to claim 4, wherein the rotation changeover mechanism 6 includes a gear mechanism.

10. A continuously variable transmission, comprising:

a casing member;

a continuously variable transmission mechanism including a primary pulley provided on a primary shaft, a secondary pulley provided on a secondary shaft, and a belt suspended between the primary pulley and the secondary pulley and enabling transmission of a motive force between the primary pulley and the secondary pulley and that, by changing a groove width of one of the primary pulley and secondary pulley relative to a groove width of the other, enables continuous adjustment of a speed-change ratio;

a motive-force connection/disconnection mechanism that, by being connected to one of the primary shaft and the secondary shaft, enables connection/disconnection between an input side element for the motive force and an output side element for the motive force, the continuously variable transmission;

a housing member fixed within the casing member accommodating therein the motive-force connection/disconnection mechanism and rotatably supporting via a bearing member the one of the primary shaft and the secondary shaft connected to the motive-force connection/disconnection mechanism; and a load-receiving element provided in coincidence with an imaginary line which perpendicularly intersects the one of the primary shaft and the secondary shaft and passes through the bearing member or in the vicinity thereof, and between the housing member and the casing member, and adapted to receive a force acting upon the housing member toward the other one of the primary shaft and the secondary shaft, wherein the load-receiving element is constructed of an inner-peripheral portion of the casing member and an outer-peripheral portion of the housing member engaged with the inner-peripheral portion of the casing member.

* * * * *